Sept. 1, 1959　　　G. H. SUNDIN　　　2,902,143
UNLOADING MECHANISM FOR BELT CONVEYORS
Filed May 1, 1957
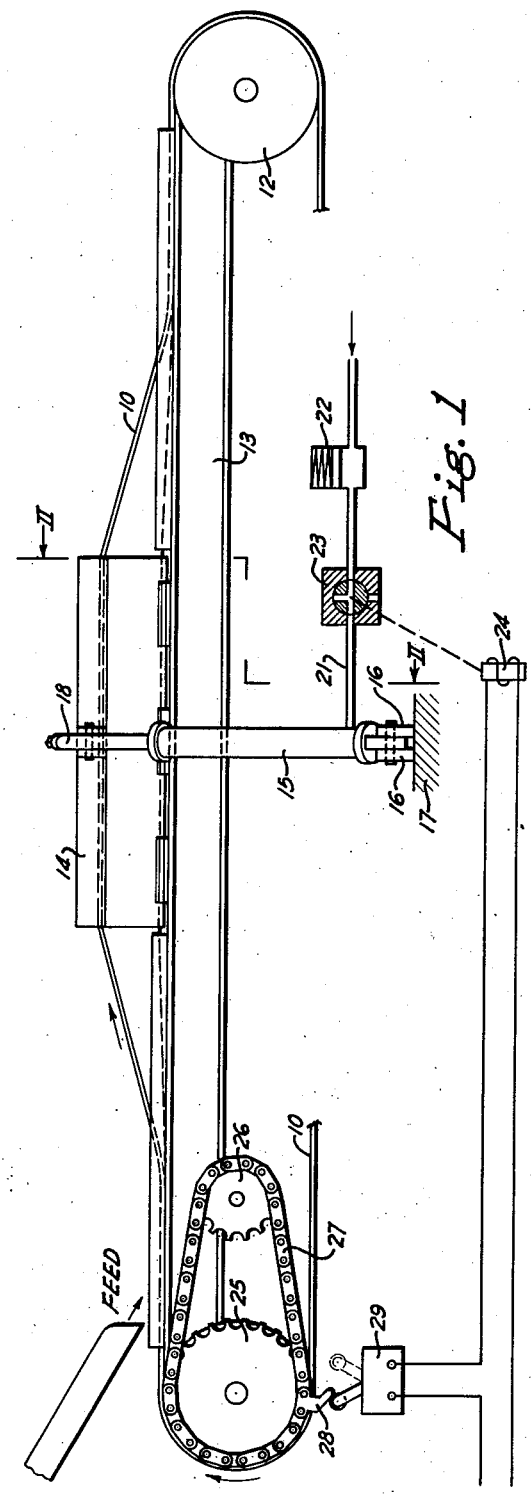
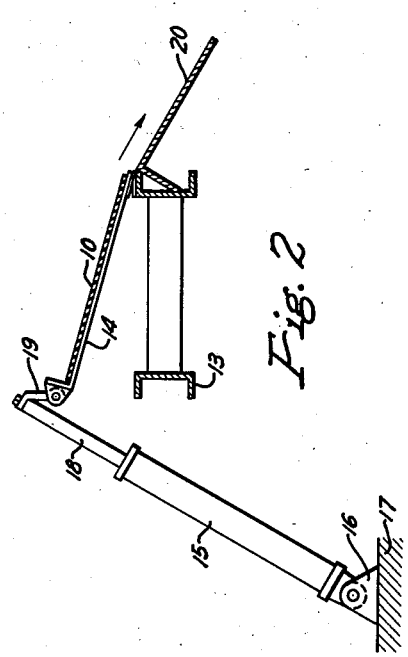
INVENTOR.
GEORGE H. SUNDIN
BY
Donald G. Dalton
HIS ATTORNEY

2,902,143

UNLOADING MECHANISM FOR BELT CONVEYORS

George H. Sundin, Duluth, Minn., assignor to United States Steel Corporation, a corporation of New Jersey Application May 1, 1957, Serial No. 656,230

4 Claims. (Cl. 198—187)

This invention relates to improved unloading mechanism for a belt conveyor.

Although my invention has general application for belt conveyors carrying any sort of loads, it is particularly useful for those which carry fragile materials, such as freshly formed balls of iron ore fines. One known procedure for agglomerating iron ore fines involves moistening the fines and forming them into balls in a rotating drum or disk. The balls then are conveyed to a heat treating apparatus, such as a shaft furnace or traveling grate, which heats them to the point of incipient fusion, thereby giving them sufficient mechanical strength for handling in a blast furnace. Before heat treatment, green balls are structurally weak and easily broken, yet they must be distributed over a considerable area when they are introduced to the heat treating apparatus in order for the latter to operate properly. Another use for which my unloading device is particularly suited is for sampling material carried on a belt conveyor, since it can cut the full stream of material to assure a representative sample.

An object of the present invention is to provide, in combination with a belt conveyor, an improved unloading mechanism which unloads the conveyor in steps without subjecting the material to rough handling.

A further object is to provide an unloading mechanism which tilts sections of a conveyor belt sideways to unload material therefrom and can include automatic control or actuating means operable each time the belt advances the length of a section.

In accomplishing these and other objects of the invention, I have provided improved details of structure, a preferred form of which is shown in the accompanying drawings, in which:

Figure 1 is a diagrammatic side elevational view of a belt conveyor equipped with an unloading device constructed in accordance with my invention, the parts being shown in their unloading position; and Figure 2 is a vertical sectional view on line II—II of Figure 1.

The drawing shows a conventional flexible conveyor belt 10 running over pulleys 12 which are journaled to a frame 13 and at least one of which is power driven. Loose material feeds to the upper flight of the belt from the left as viewed in Figure 1. In accordance with my invention, a rectangular tipping plate 14 is hinged at one edge to frame 13 for tilting on an axis parallel to the direction of belt travel and underlies the carrying flight of the belt. A fluid pressure cylinder 15 is pivoted to trunnions 16 which are mounted on a suitable support 17 situated below the carrying flight of the belt on the opposite side from the hinged mounting of plate 14. The cylinder contains a reciprocable piston and piston rod 18 connected through a pivoted link 19 to the edge of plate 14 opposite the hinged mounting. A discharge chute 20 is situated adjacent the hinged mounting of plate 14 and slopes downwardly away from belt 10. In the example of a conveyor which carries balled iron ore fines, the discharge chute either can lead to a launder at the mouth of a shaft furnace or can extend across a traveling grate.

Preferably cylinder 15 is pneumatically operated and of the single-acting, spring or gravity return type. An air inlet pipe 21 leads to the lower end of the cylinder and contains a conventional pressure regulator 22 and a three-way valve 23 having an operating solenoid 24. Normally the solenoid is deenergized and the valve is positioned to vent the cylinder, whereby the piston rod 18 is retracted and plate 14 horizontal. When the solenoid is energized, the valve moves to a position to admit compressed air to the cylinder to project the piston rod. Plate 14 swings upwardly about its hinged mounting, tilts the overlying section of belt 10 and allows material thereon to slide off sideways onto chute 20. After a brief interval, during which this section of the belt unloads its material, the solenoid is deenergized and the parts return to their normal position.

Except when my unloading mechanism is used for sampling, it includes automatic means for energizing solenoid 24 each time belt 10 advances a distance equal to the length of plate 14. This means includes a sprocket 25 mounted on the shaft which carries one of the pulleys 12, an idler sprocket 26 journaled to a suitable support spaced from sprocket 25, an endless chain 27 running over said sprockets and a cam 28 mounted on said chain. The circuit to solenoid 24 includes a normally open switch 29 positioned to be closed momentarily by cam 28 each time the cam passes the switch. The diameters of pulley 12 and sprocket 25 are in the same ratio as the lengths of plate 14 and chain 27, making the necessary allowance for thickness of the belt and chain. For example, sprocket 25 can be of the same diameter as pulley 12, and chain 27 of the same length as plate 14. The chain then travels at the same rate as the belt, and cam 28 travels a distance equal to the length of plate 14 between successive closings of switch 29. Since the plate is tilted for only an instant to unload each section of the belt, it is not necessary to stop the conveyor nor to allow for travel of the belt while tilted in timing operation of the plate. When the mechanism is used only for sampling material carried by belt 10, the sprockets and chain are omitted and solenoid 24 is energized periodically either manually or with a suitable automatic timer. Each time the solenoid is energized, it unloads a section of the belt across the full width to assure collection of a representative sample.

From the foregoing description it is seen that my invention affords a simple mechanism for unloading belt conveyors a section at a time without roughly handling the material carried by the belt. The mechanism can be used either for unloading the entire belt by sections or for unloading samples only, in which event the remainder of the material discharges in the usual manner from the end of the belt.

While I have shown and described only a single embodiment of my invention, it is apparent that modifications may arise. Therefore, I do not wish to be limited to the disclosure set forth but only by the scope of the appended claims.

I claim:

1. The combination, with a conveyor belt and a frame therefor, of an unloading mechanism comprising a normally horizontal plate underlying a section of said belt and being hingedly mounted at one edge on said frame for tilting on an axis parallel to the direction of belt travel, motive means connected to said plate for tilting it about its hinged mounting and thereby lifting a section of said belt to allow material to slide sideways therefrom, and actuating means for said motive means operatively connected with said belt and controlled by movement thereof for automatically tilting said plate each time said belt advances a distance equal to the length of said plate and thereafter allowing said plate to return to its horizontal position.

2. The combination, with a conveyor belt and a frame therefor, of an unloading mechanism comprising a normally horizontal plate underlying a section of said belt and being hingedly mounted at one edge on said frame for tilting on an axis parallel to the direction of belt travel, a pivotally mounted fluid pressure cylinder having a reciprocable piston rod connected to the opposite edge of said plate, means for admitting fluid to said cylinder to tilt said plate about its hinged mounting and thereby lift a section of said belt to allow material to slide sideways therefrom, and means operatively connected with said belt and controlled by movement thereof for automatically controlling admission of fluid to said cylinder for tilting and returning said plate each time said belt advances a distance equal to the length of said plate.

3. The combination, with a conveyor belt, a frame and a pair of spaced pulleys journaled to said frame and over which said belt runs, of an unloading mechanism comprising a normally horizontal plate underlying a section of said belt and being hingedly mounted at one edge on said frame for tilting on an axis parallel to the direction of belt travel, motive means connected to said plate for tilting it about its hinged mounting and thereby lifting a section of said belt to allow material to slide sideways therefrom, a sprocket rotatable with one of said pulleys, an idler sprocket spaced from said first named sprocket, a chain running over said sprockets, and an actuating device for said motive means carried by said chain, the diameters of said pulley and said first named sprocket being in the same ratio as the lengths of said plate and said chain to actuate said motive means and tilt and return said plate each time said belt advances a distance equal to the length of said plate.

4. The combination, with a conveyor belt, a frame and a pair of spaced pulleys journalled to said frame and over which said belt runs, of an unloading mechanism comprising a normally horizontal plate underlying a section of said belt and being hingedly mounted at one edge on said frame for tilting on an axis parallel to the direction of belt travel, a pivotally mounted fluid pressure cylinder having a reciprocable piston rod connected to the opposite edge of said plate, means for admitting fluid to said cylinder to tilt said plate about its hinged mounting and thereby lift a section of said belt to allow material to slide sideways therefrom, valve means for controlling said fluid admitting means, a sprocket rotatable with one of said pulleys, an idler sprocket spaced from said first named sprocket, a chain running over said sprockets, and an operating cam for said valve carried by said chain, the diameters of said pulley and said first named sprocket being in the same ratio as the lengths of said plate and said chain to operate said valve and thereby tilt and return said plate each time said belt advances a distance equal to the length of said plate.

References Cited in the file of this patent

UNITED STATES PATENTS

| 755,451 | Carlson | Mar. 22, 1904 |

FOREIGN PATENTS

| 116,424 | Austria | Feb. 25, 1930 |
| 462,517 | Canada | Jan. 17, 1950 |